United States Patent
Melpignano et al.

(10) Patent No.: US 7,058,083 B2
(45) Date of Patent: Jun. 6, 2006

(54) NETWORK INTERFACE DRIVER AND METHOD

(75) Inventors: Diego Melpignano, Monza (IT); David Siorpaes, Cortina d'Ampezzo (IT)

(73) Assignee: Koninklijke Phillips Electronics N.V., Eindhoven (NL)

( * ) Notice: Subject to any disclaimer, the term of this patent is extended or adjusted under 35 U.S.C. 154(b) by 1002 days.

(21) Appl. No.: 09/961,995

(22) Filed: Sep. 24, 2001

(65) Prior Publication Data

US 2002/0090003 A1 Jul. 11, 2002

(30) Foreign Application Priority Data

Sep. 28, 2000 (EP) .................................. 00203360

(51) Int. Cl.
*H04L 12/28* (2006.01)
*H04Q 7/24* (2006.01)
*G06F 15/173* (2006.01)

(52) U.S. Cl. ...................... 370/467; 370/338; 370/389; 709/224

(58) Field of Classification Search ........ 370/230–252, 370/310–338, 389–395, 428–469; 709/224–228, 709/230–234; 455/403–408, 424–426
See application file for complete search history.

(56) References Cited

U.S. PATENT DOCUMENTS

| | | | | |
|---|---|---|---|---|
| 5,907,542 A | * | 5/1999 | Kuehnel et al. | 370/331 |
| 6,026,434 A | * | 2/2000 | Kubota et al. | 725/105 |
| 6,208,620 B1 | * | 3/2001 | Sen et al. | 370/231 |
| 6,587,457 B1 | * | 7/2003 | Mikkonen | 370/356 |
| 6,646,987 B1 | * | 11/2003 | Qaddoura | 370/231 |
| 6,704,293 B1 | * | 3/2004 | Larsson et al. | 370/255 |
| 6,754,200 B1 | * | 6/2004 | Nishimura et al. | 370/349 |
| 6,791,945 B1 | * | 9/2004 | Levenson et al. | 370/235 |
| 6,876,639 B1 | * | 4/2005 | Cao | 370/331 |
| 6,907,460 B1 | * | 6/2005 | Loguinov et al. | 709/224 |
| 2002/0023162 A1 | * | 2/2002 | Ahn et al. | 709/230 |
| 2003/0149715 A1 | * | 8/2003 | Ruutu et al. | 709/100 |
| 2004/0052234 A1 | * | 3/2004 | Ameigeiras et al. | 370/338 |

OTHER PUBLICATIONS

Bakshi et al., "Improving performance of TCP over wireless networks," May 27, 1997, pp. 365-373.
Balakrishnan et al., "Improving TCP/IP Performance Over Wireless Networks," Nov. 1995, page Complete.

* cited by examiner

*Primary Examiner*—Man U. Phan
(74) *Attorney, Agent, or Firm*—Barry Liberchuk

(57) ABSTRACT

A network interface driver is provided for the communication of TCP packets involving a mobile terminal and a wireless link. Acknowledgement signals are sent responsive to TCP data packets. A control element is arranged to prevent acknowledgement signals that are delayed in the wireless link from triggering a time-out signal in the TCP packet source.

21 Claims, 2 Drawing Sheets

NETWORK INTERFACE DRIVER AND METHOD

The present invention relates to a network interface driver for the communication of TCP packets involving a mobile terminal.

In the field of mobile communications, problems can arise when TCP and IP communications are conducted over a connection experiencing operational noise in as much as adverse interactions between, for example, the TCP and LLC protocols results in performance degradation within the connection. Such performance degradation arises in terms of a throughput reduction in the connection and unnecessary retransmissions of data packets. The latter problem can prove particularly disadvantageous in that it also serves to decrease battery life within the mobile terminal and also leads to an inefficient use of the available bandwidth.

The present invention seeks to provide for a network interface and related operational method exhibiting advantages over such known interfaces and methods.

According to a first aspect of the present invention, there is provided a network interface driver of the type defined above and characterized by a control element arranged to prevent acknowledgement signals that are delayed in the wireless link from triggering a time-out signal in the TCP packet source.

The invention can prove advantageous in providing, for example, an improved quality of TCP/IP bluetooth connection in environments where poor link quality, or poor interface quality, degrade the performance.

Advantages are achieved in applications where the traffic characteristics are symmetrical, such as allowing for faster data downloads and improved utilization of the available bandwidth and the related decreased number of the transmissions.

With the control element of the present invention advantageously arranged to run only at a bluetooth access point for a network, which can comprise, for example, a set-top box, personal computer or mobile phone, it is noted that, in offering a symmetrical solution, no specific modifications are necessary inside the mobile terminal nor is any standardization required.

According to a second aspect of the present invention, there is provided a computer program product arranged for use in a network interface driver for the communication of TCP packets involving a mobile terminal, and characterized in that the computer program product exhibits a control function serving to prevent acknowledgement signals that are delayed in the wireless link from triggering a time-out signal at the TCP packet source.

According to a third aspect of the present invention there is provided a method of controlling the communication of TCP packets involving a network interface driver and a mobile terminal, characterized by the step of preventing acknowledgement signals that are delayed in the wireless link from triggering a time-out signal in the TCP packet source.

The invention is described further hereinafter, by way of example only, with reference to the accompanying drawings in which.

Figure 1:
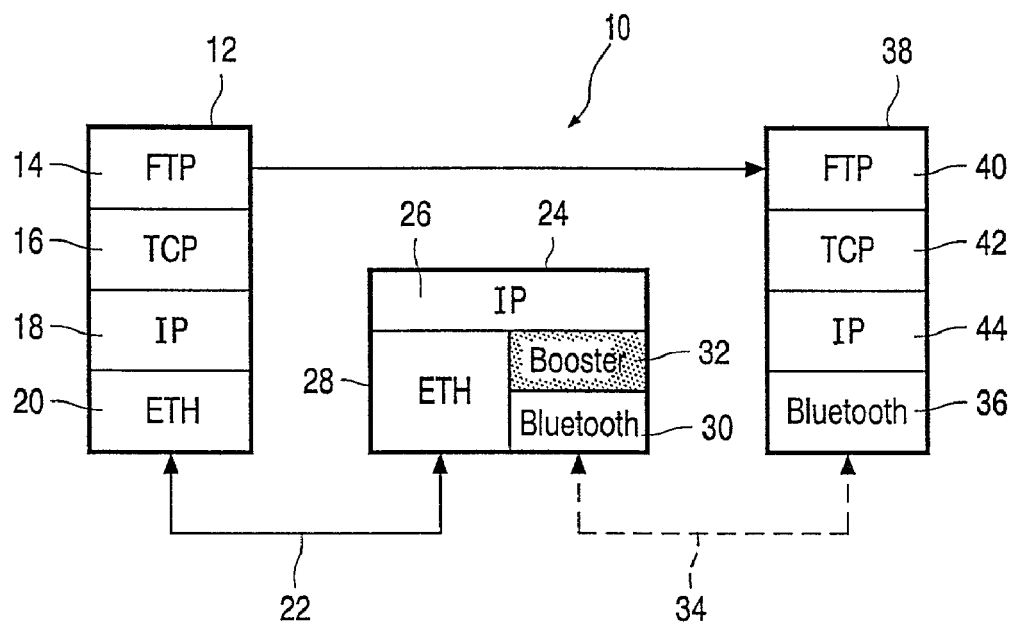
FIG. 1 is a schematic block diagram of a wireless communication arrangement according to an embodiment of the present invention.

Turning first to FIG. 1, there is illustrated a schematic block diagram of a wireless communication arrangement 10 employing a network server 12 comprising, in descending order, an FTP 14, Transport Control Protocol 16, Internet Protocol 18, and having an ethernet connection layer 20 stack which is connected via a wire link 22 to a wireless access point 24 again exhibiting a layered structure comprising an Internet Protocol layer 26, an ethernet connection layer 28 and a Bluetooth logical link control layer 30. Located between the Internet Protocol layer 26 and the Bluetooth Logical Link Control layer 30 is the subject matter of the present invention which comprises a booster arrangement 32 embodied a computer program product. A wireless link 34 is achieved between the Bluetooth Logical Link Control layer 30 of the access point 24 and a corresponding Bluetooth Logical Link Control layer 36 of a mobile terminal 38. Again, the mobile terminal 38 includes a layered protocol stack structure comprising, in descending order, an FTP layer 40, a Transport Control Protocol layer 42 and an Internet Protocol layer 44 located above the Bluetooth Logical Link Control layer 36 of the mobile terminal 38.

As mentioned, the Bluetooth TCP booster 32 according to the illustrated embodiment of the present invention can comprise a software product inserted in the network interface driver of a wireless access point 24 and which is arranged to act on TCP data packets in both the downstream and upstream direction of data transfer. The embodiment illustrated in FIG. 1 also assumes that the mobile terminal 38 connects to the server 12 by way of the access point 24 and which therefore effectively serves as an IP router.

The booster 32 monitors the transmitted TCP packets in accordance with the established communication streams and is arranged to recognize acknowledgement signals sent effectively in a reverse direction during the communication by monitoring the content of the IP and TCP headers within the data packets.

Figure 3:
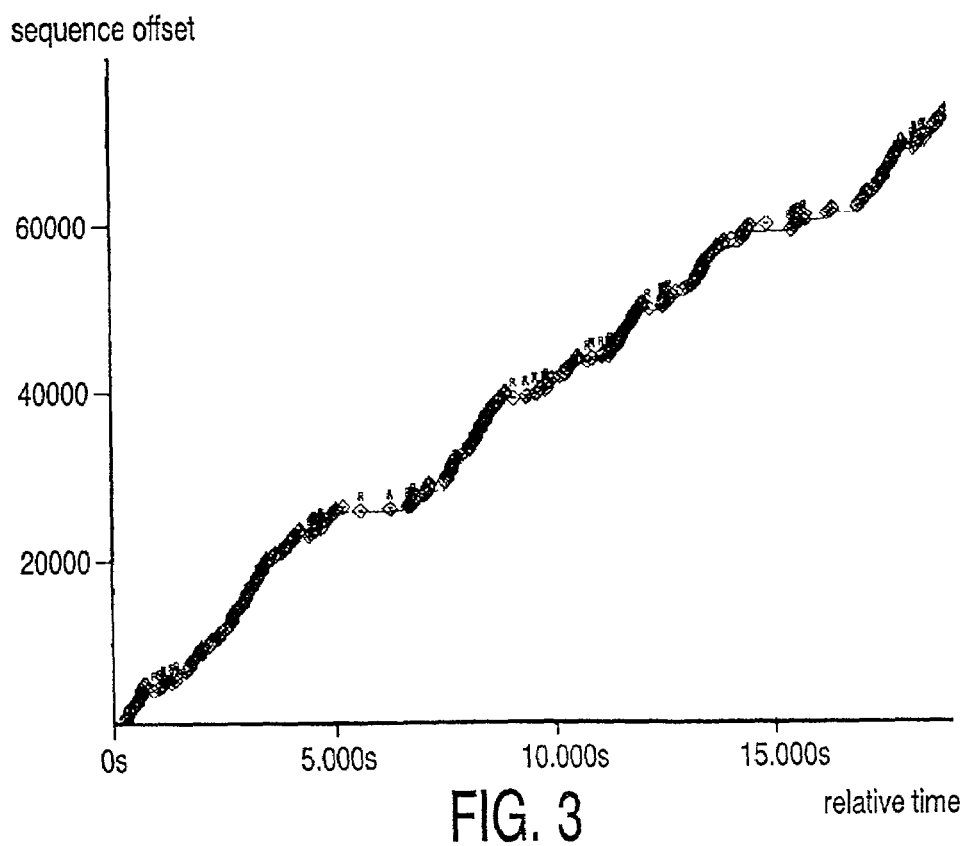
FIG. 3 is a graphical representation of FTP Bluetooth data transfer without the control element of the present invention.

The present invention arises from the important recognition that in operationally intense, i.e. noisy, wireless link conditions, acknowledgement signals can become delayed in, for example, the upstream direction of communication traffic and this disadvantageously causes a TCP time-out to be invoked at the source i.e. the sender of the originating data packets. Once such a time out has been invoked at the source, TCP data packets that have, for example, already been correctly received at the mobile terminal are retransmitted. Likewise, the system throughput is disadvantageously decreased due to a congestion control phase of the TCP protocol being invoked in view of this potential increase in the traffic. An example of such a condition is illustrated in FIG. 3 as discussed further below.

As appreciated, and in accordance with the present invention, the booster employed within the arrangement of FIG. 1 seeks to prevent such disadvantageous conditions arising by seeking to detect late acknowledgement signals in the upstream wireless link and, in response to such detection, serving to suspend the activity of the TCP sender before the time-out period expires and so before the aforementioned time-out can be invoked.

Figure 2:
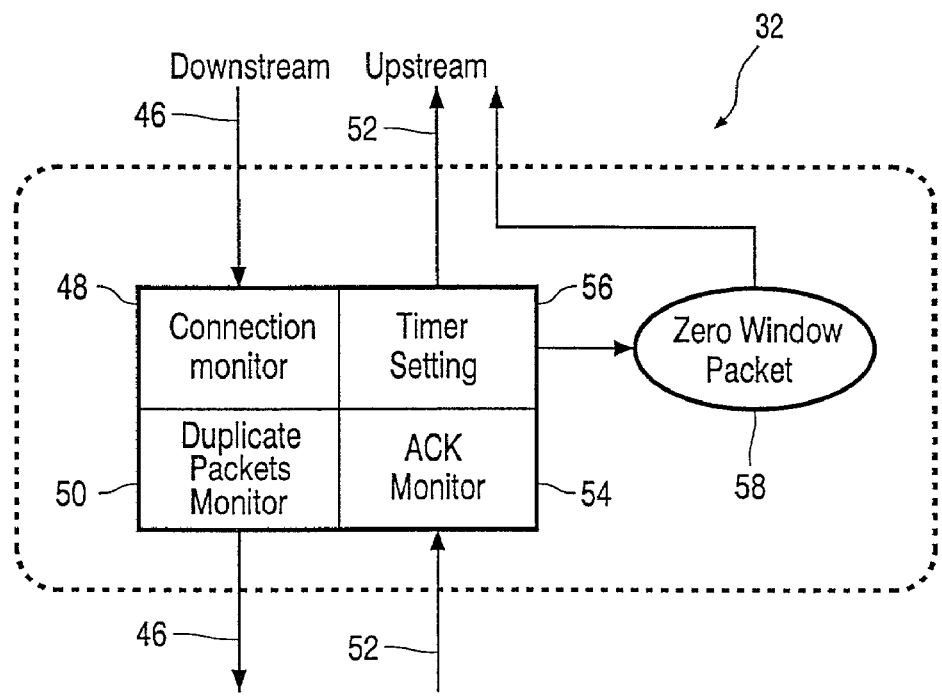
FIG. 2 is a schematic block diagram of the Bluetooth TCP booster illustrated in FIG. 1.

FIG. 2 illustrates the booster 32 of FIG. 1 in greater detail As noted previously, the booster is arranged to handle both the downstream and upstream data and the downstream data 46 is arranged to pass through a connection monitor 48 which serves to monitor all TCP packets that are transmitted to the mobile terminal 38 as illustrated in FIG. 1. The connection monitor 48 performs such monitoring by storing the sequence number of the most recently sent TCP packets. When a new TCP data packet arrives at the connection monitor 48 comprises of sequence numbers is conducted within a duplicate-packet monitor 50 before exiting the booster 32 with the aforementioned stored value so that TCP data packets that have been retransmitted by the TCP sender can be ignored. Such a process is to be executed for each TCP communication connection that remains open and where the control aspect of the present invention as offered by the booster of FIG. 1 is to be applied.

In the direction of upstream data flow, the flow of acknowledgements, for example, 52, is monitored by an acknowledgement monitor 54 and the inter-arrival time between consecutive acknowledgement signals is monitored under the control of a timer setting control 56 and when a threshold is exceeded, a zero-window acknowledgement signal 58 is generated and transmitted to the TCP sender so as to suspend operation of the TCP sender and thereby prevent the above-mentioned time-out being invoked. The generation of the zero window acknowledgement signal serves to effectively block the transmission of new data packets and the TCP time-out process within the sender.

The acknowledgement monitor 54 in the booster 32 serves to activate a timer (not specifically shown) for each connection that is under its control and, as mentioned, upon expiration of the predetermined time period as set by means of the timer setting 56, the zero-window acknowledgement signal 58 is transmitted in the upstream direction as previously noted.

It is an important aspect of the present invention to ensure that the time period established by the timer setting 56 is accurately calculated in order for the booster 32 embodying the present invention to be effected.

For example, if the set timer value is too small, then zero-window acknowledgement signals might be unnecessarily transmitted upstream to the TCP sender and this carries the disadvantage of creating unnecessary pauses in the transmission. However, when the acknowledgement signal that was being delayed in the wireless network finally arrives at the access point, it is transmitted to the TCP sender and causes transmission to be resumed. In the alternative however, if the timer value is too large, then a time-out at the TCP sender is quite likely to be invoked and the transmission of the zero-window acknowledgement signal would then be ineffective.

The timer value calculation can generally be achieved as follows from:

$$RTT_{i+1} = \alpha RTT_i + \beta \cdot \text{delay}$$

where RTT is the estimated round trip time (in the wireless link) which is updated each time a new ACK arrives and delay is the interarrival time between two consecutive ACK's in the upstream. $\alpha$ and $\beta$ are such that their sum is unitary. The timer value can simply be calculated from RTT in the following way:

$$T_{out} = K \cdot RTT \qquad (2)$$

Experimentation has shown that the values:

$$\begin{aligned} \alpha &= 0.7 \\ \beta &= 0.3 \\ K &= 2.5 \end{aligned} \qquad (3)$$

provide the desired behavior for the LAN case, i.e. when the round trip delays between the server and the AP are small. In situations where the network delay between the server and the AP is larger, K should be decreased accordingly.

Figure 4:
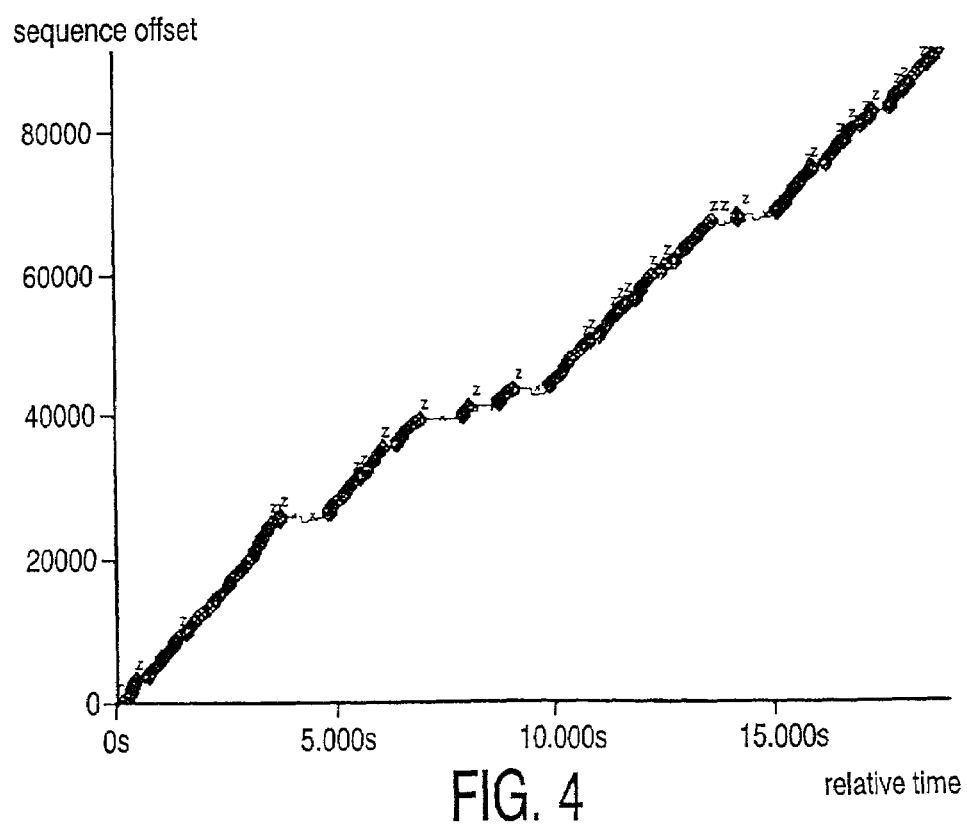
FIG. 4 is a similar graphical representation to FIG. 3 but arising from FTP Bluetooth transfer employing the control element of the present invention.

Turning now to the graphs of FIGS. 3 and 4, measurements arising in relation to the configuration illustrated in FIG. 1 above have been taken and the graphs of FIGS. 3 and 4 plotted.

The results as plotted in FIGS. 3 and 4 are for the same link conditions, with TCP Reno implementation in the TCP sender in a LAN environment. As will be appreciated, each of the graphs depicts the transferred bites v time and also highlight the occurrence of TCP retransmissions which are marked with a 'R'.

As illustrated in FIG. 3 which represents the situation not employing the booster embodying the present invention, several retransmissions occur resulting in a waste of bandwidth and a disadvantageous reduction in the throughput.

However, in FIG. 4, which illustrates the results achieved when employing the booster embodying the present invention, it is quite clear that the connection is improved since the retransmissions have been eliminated by sending timely acknowledgement signals with a null-advertised window which are illustrated by 'Z' in FIG. 4 back to the TCP sender.

The overall result is that, while in the first case illustrated in FIG. 3 an average throughput of 320 Kb/s can be achieved, in the second case embodying the present invention and as illustrated in FIG. 4, an average throughput of 352 Kb/s is achieved which represents an increase in throughput of in the region of 10%. As will be appreciated, the elimination of the retransmissions illustrated in FIG. 3 serves advantageously to prevent unnecessary use of the bandwidth on the wireless link.

As will be appreciated, the present invention finds particular application in use in the Bluetooth enabled mobile communication devices.

It should also be noted that the above-mentioned comparison as illustrated via FIGS. 3 and 4 have been obtained by way of a real-time Bluetooth test bed offering different channel conditions and including interference from IEEE 802.11 systems in the 2.4 GHz band.

Thus, employing the proposed booster embodying the present invention can advantageously lead to throughput improvements and improved utilization of the wireless link.

The invention claimed is:

1. A network interface driver for communication of TCP packets involving a mobile terminal and a wireless link and in which acknowledgement signals are sent responsive to TCP data packets, the network interface driver comprising a control element arranged to prevent acknowledgement signals that are delayed in the wireless link from triggering a time-out signal in a TCP packet source, wherein the control element comprises TCP monitoring means for a downstream data direction and an acknowledgement signal monitoring means for an upstream direction.

2. The network interface driver as claimed in claim 1, and located between IP and LLC protocol layers so as to operate on the TCP packets.

3. The network interface driver as claimed in claim 1, and provided in a wireless link access point.

4. The network interface driver as claimed in claim 1, wherein the control element comprises a computer program product.

5. The network interface driver as claimed in claim 1, wherein the acknowledgement signal monitoring means is arranged to monitor an interarrival time between successive acknowledgement signals.

6. The network interface driver as claimed in claim 5, and including means for performing a comparison the said monitored interarrival time with a threshold value and for generating a control signal responsive to a result of the comparison.

7. The network interface driver as claimed in claim 6, wherein the control signal comprises a zero-window acknowledgement signal that is sent back to the TCP packet source.

8. The network interface driver as claimed in claim 6, wherein the said threshold value is selectable by way of a timer setting means.

9. The network interface driver as claimed in claim 1, wherein the acknowledgement signal monitoring means is arranged to initiate operation of a timer upon identification of a received acknowledgement signal.

10. A computer program product arranged for use in a network interface driver for communication of TCP packets involving a mobile terminal and a wireless link, wherein the computer program product exhibits a control function serving to prevent acknowledgement signal that are delayed in the wireless link from triggering a time-out signal at a TCP packet source, the computer program product being further arranged for monitoring TCP packets in a downstream data direction and for monitoring acknowledgement signals in an upstream data direction.

11. The computer program product as claimed in claim 10, and arranged for monitoring an interarrival time between successive acknowledgement signals.

12. The computer program product as claimed in claim 11, and arranged to perform a comparison the interarrival time with a threshold value and to initiate a control signal responsive to a result of the comparison.

13. A method of controlling communication of TCP packets involving a network interface driver, a mobile terminal and a wireless link, the method comprising the acts of:

preventing acknowledgement signals that are delayed in the wireless link from triggering a time-out signal in a TCP packet source;

monitoring TCP packets in a downstream data direction; and monitoring acknowledgement signals sent in an upstream data direction.

14. The method as claimed in claim 13, wherein the act of monitoring the acknowledgement signals includes the act of monitoring an interarrival time between successive acknowledgement signals.

15. The method as claimed in claim 14, further including the acts of:

comparing the said monitored interarrival time with a threshold value; and generating a control signal responsive to a result of the comparing act.

16. The method as claimed in claim 15, wherein the act of generating a control signal comprises generating a zero-window acknowledgement signal and sending the same to the TCP packet source.

17. The method as claimed in claim 13, and including the act of initiating a timer responsive to receipt of an acknowledgement signal.

18. A mobile terminal having a network interface driver for communication of TCF packets involving a mobile terminal and a wireless link and in which acknowledgement signals are sent responsive to TCP data packets, the mobile terminal comprising a control element arranged to prevent acknowledgement signals that are delayed in the wireless link from triggering a time-out signal in a TCP packet source, wherein the control element comprises TCP monitoring means for a downstream data direction and an acknowledgement signal monitoring means for an upstream direction.

19. The mobile terminal as claimed in claim 18, and located between IP and LLC protocol layers so as to operate on the TCP packets.

20. The mobile terminal as claimed in claim 18, and provided in a wireless link access point.

21. The mobile terminal as claimed in claim 18, wherein the control element comprises a computer program product.

\* \* \* \* \*